(12) United States Patent
Gebhard

(10) Patent No.: US 11,951,826 B2
(45) Date of Patent: Apr. 9, 2024

(54) DRIVE APPARATUS FOR A VEHICLE AXLE OF A VEHICLE

(71) Applicant: AUDI AG, Ingolstadt (DE)

(72) Inventor: Bastian Gebhard, Beilngries (DE)

(73) Assignee: AUDI AG, Ingolstadt (DE)

( * ) Notice: Subject to any disclaimer, the term of this patent is extended or adjusted under 35 U.S.C. 154(b) by 50 days.

(21) Appl. No.: 17/781,454

(22) PCT Filed: Nov. 9, 2020

(86) PCT No.: PCT/EP2020/081412
§ 371 (c)(1),
(2) Date: Jun. 1, 2022

(87) PCT Pub. No.: WO2021/110359
PCT Pub. Date: Jun. 10, 2021

(65) Prior Publication Data
US 2023/0001785 A1    Jan. 5, 2023

(30) Foreign Application Priority Data

Dec. 2, 2019    (DE) ..................... 10 2019 132 591.9

(51) Int. Cl.
*B60K 17/02* (2006.01)
*B60K 17/12* (2006.01)
(Continued)

(52) U.S. Cl.
CPC .............. *B60K 17/02* (2013.01); *B60K 17/12* (2013.01); *F16D 11/14* (2013.01); *F16D 23/12* (2013.01)

(58) Field of Classification Search
CPC ..... B60L 2240/50; F16D 11/14; B60K 17/02; B60K 17/356; B60K 2001/001; B60W 10/02; B60W 10/08
See application file for complete search history.

(56) References Cited

U.S. PATENT DOCUMENTS 9,037,326 B2    5/2015   Schaeffer et al.
2015/0107955 A1*  4/2015   Tronnberg .............. F16D 11/10
                                                      192/69.8
(Continued)

FOREIGN PATENT DOCUMENTS

CN         209340482 U    9/2019
DE   20 2012 006 745 U1   10/2012
(Continued)

OTHER PUBLICATIONS

International Search Report dated Jan. 28, 2021 from International Application No. PCT/EP2020/081412.
(Continued)

*Primary Examiner* — Stacey A Fluhart
(74) *Attorney, Agent, or Firm* — STAAS & HALSEY LLP

(57) ABSTRACT

A two-tracked vehicle is powered by an electric machine which operates as a motor to rotate output shafts via an axle differential with each of the output shafts coupled to a vehicle wheel. One of the output shafts is subdivided into a wheel-side shaft portion and an electric-machine-side shaft portion which can be drivingly coupled to each other by a form-fit coupling to bring the electric machine into driving connection with the vehicle wheels during driving operation. The wheel-side shaft portion and electric-machine-side shaft portion can be decoupled from each other to prevent drag losses during driving operation when the electric machine is deactivated.

16 Claims, 4 Drawing Sheets

(51) Int. Cl.
    *F16D 11/14*     (2006.01)
    *F16D 23/12*     (2006.01)

(56) References Cited

U.S. PATENT DOCUMENTS

| | | | |
|---|---|---|---|
| 2017/0167544 A1 | 6/2017 | Beesley et al. | |
| 2018/0134154 A1* | 5/2018 | Shimizu | F16D 21/08 |
| 2019/0184807 A1* | 6/2019 | Okamura | B60W 30/182 |
| 2020/0361465 A1* | 11/2020 | Kim | B60K 23/0808 |
| 2021/0086611 A1* | 3/2021 | Inoh | B60K 17/16 |

FOREIGN PATENT DOCUMENTS

| | | |
|---|---|---|
| DE | 10 2011 088 668 A1 | 6/2013 |
| DE | 10 2012 212 268 A1 | 5/2014 |
| DE | 10 2014 115 127 A1 | 4/2015 |
| DE | 20 2015 000 397 U1 | 6/2015 |
| DE | 10 2015 010 121 A1 | 2/2017 |
| DE | 10 2017 204 113 A1 | 9/2018 |
| DE | 10 2019 132 591.9 | 2/2019 |
| DE | 11 2017 002 133 T5 | 5/2019 |
| EP | 2 409 873 B1 | 10/2012 |
| WO | PCT/EP2020/081412 | 11/2020 |

OTHER PUBLICATIONS

German Office Action dated May 25, 2020 from German Application No. 10 2019 132 591.9.
Translation by WIPO of the Written Opinion of the International Searching Authority, dated Jan. 28, 2021, in International Application No. PCT/EP2020/081412 (8 pp.).

* cited by examiner

DRIVE APPARATUS FOR A VEHICLE AXLE OF A VEHICLE

CROSS REFERENCE TO RELATED APPLICATIONS

This application is a U.S. national stage of International Application No. PCT/EP2020/081412, filed on Nov. 9, 2020. The International Application claims the priority benefit of German Application No. 10 2019 132 591.9 filed on Dec. 2, 2019. Both the International Application and the German Application are incorporated by reference herein in their entirety.

BACKGROUND

Described below are a drive apparatus for a vehicle axle of a two-track vehicle and to a method for operating such a drive apparatus.

In an all-wheel-drive vehicle of the generic type having an electric drive, the front axle and the rear axle independently of each other can have at least one electric machine. Depending on the driving mode, the electric machine of the front axle, for example, can be unenergized and only the electric machine of the rear axle can be energized, and therefore the vehicle is driven only by the rear axle. This increases the overall efficiency and extends the range. However, with a pure rear axle operation of this type, friction losses occur because of the carried-along, deactivated front axle drive.

DE 20 2015 000 397 U1 discloses an actuating device for a claw clutch. EP 2 409 873 B1 discloses a method for operating a drive train of a motor vehicle.

SUMMARY

Described below are a drive apparatus for a vehicle axle of an electrically operated vehicle and a method for operating such a drive apparatus, in which drag losses in a deactivated electric machine can be reduced in the driving mode.

As described below, an electric machine outputs drive via an axle differential to output shafts which each lead to a vehicle wheel. One of the output shafts is divided into a wheel-side shaft section and an electric-machine-side shaft section. The two shaft sections can be coupled in terms of drive to each other by a positively locking clutch, in the driving mode, to bring the electric machine into driving connection with the vehicle wheels. Alternatively thereto, the two shaft sections can be decoupled from each other in the driving mode, when the electric machine is deactivated, to avoid drag losses. The positively locking clutch may be realized as a sliding sleeve which is arranged on spline teeth of a first of the two shaft sections non-rotatably, but so as to be displaceable axially. The sliding sleeve can be displaceable by an actuating force, which is generated by an actuator, between an open clutch state and a closed clutch state. In the open clutch state, the sliding sleeve is not in positively locking connection with the second shaft section. By contrast, in the closed clutch state, the sliding sleeve is in positively locking connection with the second shaft section. The actuator is in electric signal connection with an actuator control device. When there is a clutch engagement requirement, the coordinator activates the actuator with a closing signal to close the positively locking clutch. By contrast, when there is not a clutch engagement requirement, the coordinator activates the actuator with an opening signal to open the positively locking clutch.

The presence/absence of a clutch engagement requirement is determined in a main control device that is superior to the coordinator, in particular a driving dynamics controller, depending on current driving mode parameters. According to an embodiment, the main control device is not in direct signal connection with the actuator, but rather is in signal connection with the actuator with the interposition of the coordinator.

The coordinator can be realized as a microcontroller and/or has a local, decentral decision-making capability in the event of a malfunction in the coupling or decoupling operation, and therefore more rapid elimination of faults is possible than in the related art.

In an embodiment, the coordinator is in signal connection with the electric machine. Before a coupling operation or a decoupling operation is carried out, the coordinator activates the electric machine in such a manner that, during the coupling or decoupling operation, a substantially load-free clutch actuation of the positively locking clutch is ensured.

In a specific embodiment variant, before the coupling operation, a synchronization can be carried out with the aid of the actuator control device. In the synchronization, the coordinator can activate the electric machine in such a manner that synchronism substantially prevails between the wheel-side shaft section and the electric-machine-side shaft section. As soon as there is synchronism, the coordinator generates the closing signal to start the coupling operation.

In addition, before the start of the decoupling operation, the coordinator can carry out a zero-torque regulation. In the zero-torque regulation, the coordinator activates the electric machine in such a manner that a substantial torque relief, in particular torque freedom prevails in the still closed positively locking clutch. Without such a zero-torque regulation, when the electric machine is deactivated, the positively locking clutch which is still closed would be loaded with the drag torque. If a drag torque is excessively large, there would be the problem (without zero-torque regulation) that the actuating force exerted by the actuator may not be sufficient to release the positively locking clutch.

To provide a reliable coupling operation and decoupling operation, during the synchronization or during the zero-torque regulation, the coordinator permanently monitors the wheel rotational speed (that is to say the output rotational speed) and the electric machine rotational speed.

To further increase the reliability during the actuation of the clutch, a position sensor may be assigned to the coordinator. An actual position of the sliding sleeve can be detected by the position sensor. After a coupling operation or decoupling operation has taken place, a plausibility check can be carried out in the actuator control device, in which the sliding sleeve actual position detected by the position sensor is checked for plausibility. The plausibility check checks whether the sliding sleeve actual position coincides with a sliding sleeve decoupling position or sliding sleeve coupling position, the positions being stored in the coordinator. If they coincide, a satisfactory decoupling operation or coupling operation can be assumed.

In respect of the high packing density in the region of the vehicle axle, it is of great importance for the positively locking clutch together with the actuator to be realized compactly so as to reduce construction space. Against this background, the actuator can be assigned an actuator sleeve which is arranged on a cylindrical sliding sleeve outer circumference. For the rotational uncoupling from the sliding sleeve, which rotates during operation, the actuator sleeve can be mounted on the sliding sleeve outer circumference via at least one rolling bearing, specifically in such a manner that the axial actuating force generated by the actuator is introduced into the sliding sleeve via the rotationally uncoupled actuator sleeve and the rolling bearing.

In an embodiment variant, for a transmission of actuating force, both the bearing outer ring of the rolling bearing can be connected to the actuator sleeve in a manner transmitting actuating force and the bearing inner ring of the rolling bearing can be connected to the sliding sleeve in a manner transmitting actuating force.

The above actuator sleeve can be displaced by the actuator between an open position, in which the positively locking clutch is open, and a closed position. For this purpose, the actuator can interact with the actuator sleeve via a transmission stage. In a realization which is advantageous in terms of construction space, the transmission stage can have an external teeth on the cylindrical sliding sleeve outer circumference. The external teeth are spaced apart from one another in the axial direction and are in toothed engagement with a gear wheel of an actuator shaft of an electric motor which forms the actuator.

A positively locking clutch may be designed as a claw clutch in which the sliding sleeve and the second shaft section have mutually axially facing wheel- and axle-side shift claws. The cylindrical sliding sleeve outer circumference can merge into the larger-diameter shift claws, with an inner corner region being formed. The actuator sleeve can be arranged in the resulting inner corner region in a manner advantageous in terms of construction space.

During the coupling operation (that is to say closing operation) of the above claw clutch, the wheel- and axle-side shift claws can be opposite one another in the axial direction tooth on space such that a smooth positively locking clutch can run. By contrast, in the more probable situation, during the closing operation, the shift claws initially come into contact tooth on tooth. After reaching the tooth on tooth contact, according to an embodiment the actuator sleeve is displaced further until it reaches its closed position, specifically by building up a spring force of an overload spring that acts axially on the shift claws and by which the wheel- and axle-side shift claws are braced in relation to one another. As soon as the shift claws are brought into a tooth on space relative position by a small relative angular rotation of the two clutch halves, the wheel- and axle-side shift claws can enter into positively locking connection with the spring force being dissipated.

In a technical realization, the wheel-side shift claws can be formed on a carrier ring which is arranged spline teeth on the wheel-side shaft section so as to be nonrotatable and axially displaceable. On its side axially opposite the electric machine-side shaft section, the carrier ring can be supported against an axial stop of the wheel-side shaft section via the abovementioned overload spring. If, therefore, during the closing operation of the claw clutch, the wheel- and axle-side shift claws come into tooth on tooth contact, the actuator sleeve is displaced together with the sliding sleeve into the closed position, and therefore the sliding sleeve, by building up the spring force, displaces the carrier ring on the wheel-side shaft section by a compensating stroke. As soon as there is tooth on space because of a small relative angular rotation of the two clutch halves, the positively locking connection takes place in which the wheel-side carrier ring, by using up the above compensating stroke and by dissipating the spring force, enters into positively locking connection with the axle-side shift claws.

BRIEF DESCRIPTION OF THE DRAWINGS

An exemplary embodiment is described below with reference to the attached figures, in which.

DETAILED DESCRIPTION

Figure 1:
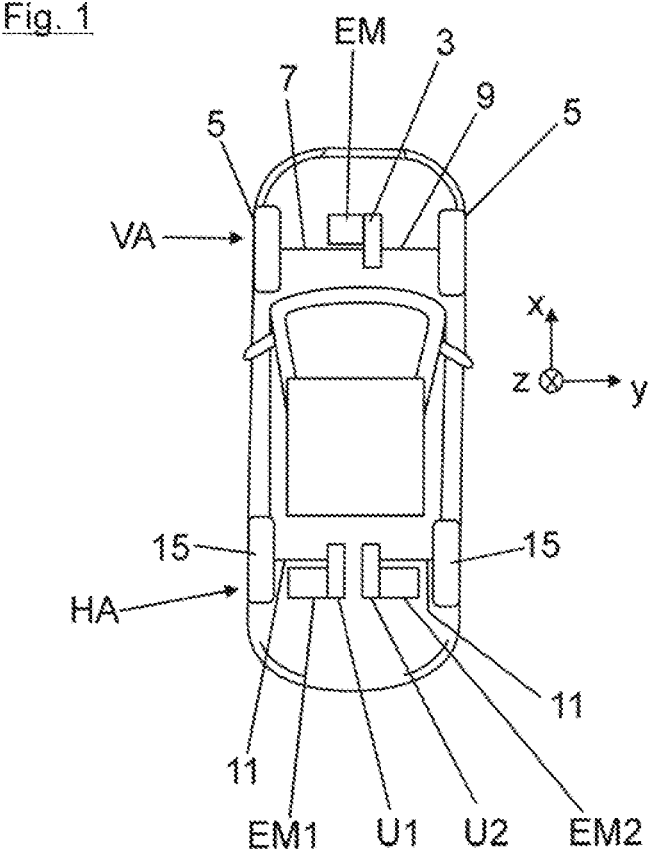
FIG. 1 is a roughly schematic top view of an electrically operated motor vehicle with vehicle axles emphasized and illustrated in outlined form.

Reference will now be made in detail to the preferred embodiments, examples of which are illustrated in the accompanying drawings, wherein like reference numerals refer to like elements throughout.

FIG. 1 shows an electrically operated motor vehicle which has an electrically driveable front axle VA and an electrically drivable rear axle HA. The front axle VA is provided with precisely one electric machine EM operates as a motor which outputs drive via a front axle differential 3 to the left and right drive shafts 7, 9 leading to the right and left front wheel 5. The rear axle HA has a drive apparatus in which, in contrast to the front axle VA, each of the rear wheels 15 is assigned in each case an electric machine EM1, EM2 which are connected in terms of drive to the drive shafts 11 of the rear axle HA via transmission ratio stages U1, U2. As is furthermore revealed in FIGS. 2 and 3, the front right drive shaft 9 is divided into a wheel-side shaft section 17 and an electric machine-side shaft section 19. The shaft sections can be coupled by a claw clutch 21 in the driving mode to bring the electric machine EM into driving connection with the vehicle wheels 5. Alternatively, the shaft sections 17, 19 can be decoupled from each other in the driving mode when the electric machine EM is deactivated, to avoid drag losses.

When the claw clutch 21 is open, only a load-free compensating movement of the compensating bevel gears 29 therefore remains in the front axle differential 3 in the driving mode. By contrast, the rest of the drive unit (that is to say transmission and electric machine) comes to a standstill, and therefore drag losses are greatly reduced.

Figure 2:
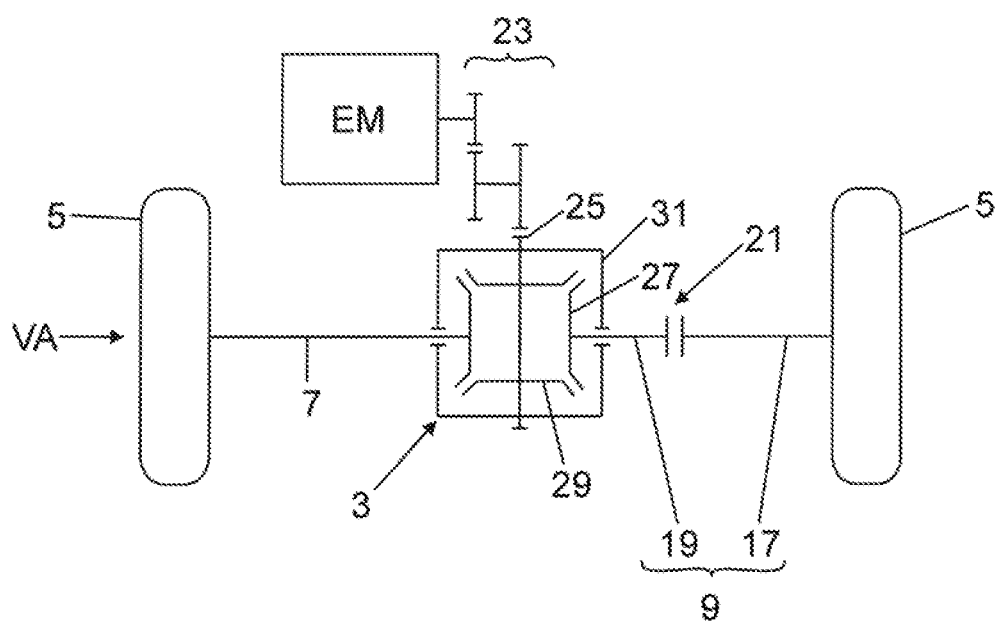
FIG. 2 is a schematic diagram of a drive apparatus for the front axle of the vehicle.

In FIG. 2, the electric machine EM of the front axle VA is connected in terms of drive via a reduction gearing 23 to an input-side outer gear wheel 25 of the front axle differential 3. On the output side of the front axle differential 3, axle bevel gears 27 are connected to the two drive shafts 7, 9. The axle bevel gears 27 and therefore toothed compensating bevel gears 29 are positioned inside a compensating housing 31 of the axle differential 3.

Figure 3:
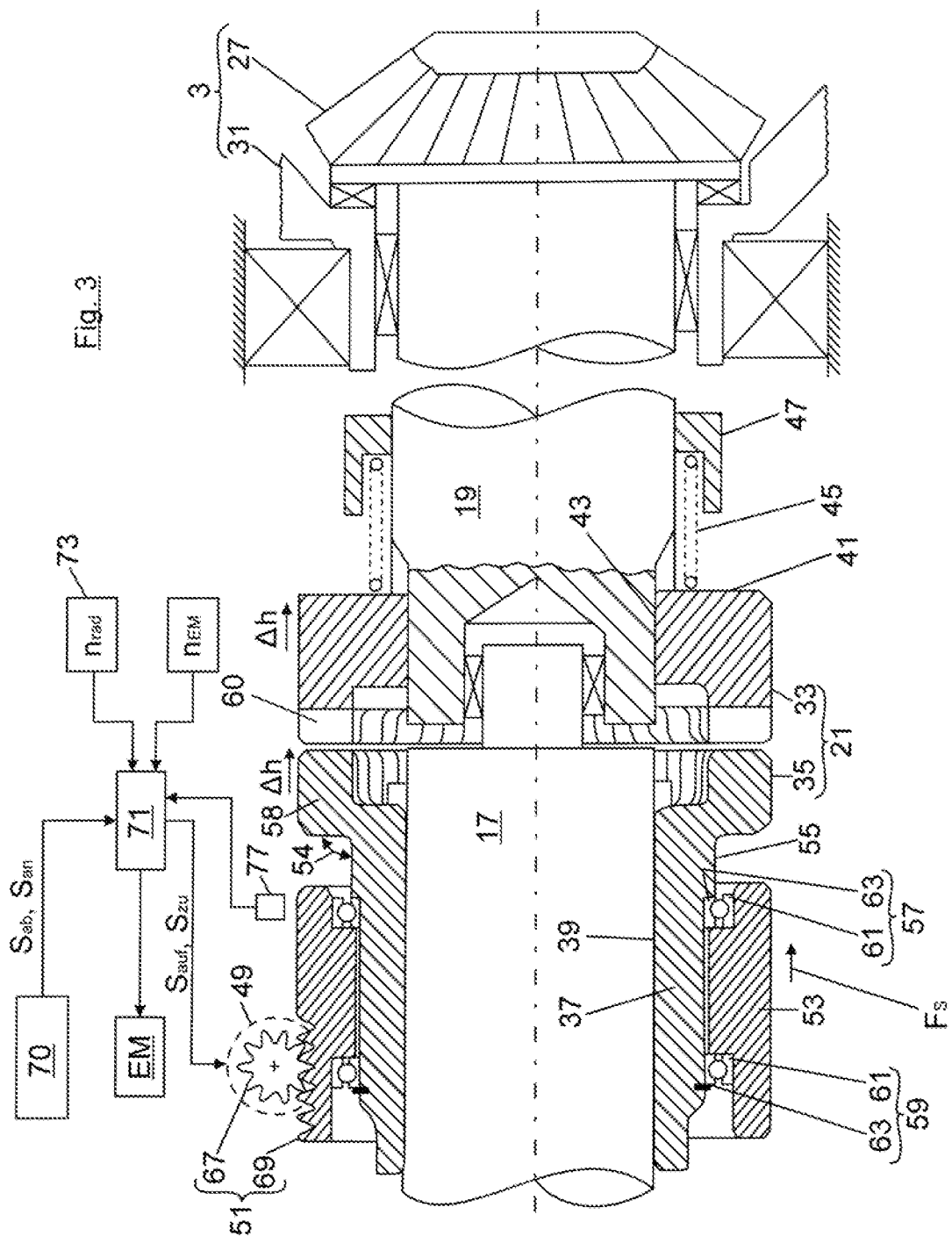
FIG. 3 is a partial cross-sectional view of an exemplary embodiment of a claw clutch which is illustrated in the open clutch state.

The construction and the operation of the claw clutch 21 will be described below with reference to FIG. 3. In FIG. 3, the axle bevel gear 27 is extended by the electric machine-side shaft section 19. A stub shaft which is guided to the front wheel 5 and which forms the wheel-side shaft section 17 is mounted rotationally radially within the electric machine-side shaft section 19. In FIG. 3, the claw clutch 21 has axle-side shift claws 33 and wheel-side shift claws 35 which are in positively locking connection with one another when the claw clutch 21 is closed. In FIG. 3, the wheel-side shift claws 35 are parts of a sliding sleeve 37 which is arranged on spline teeth 39 of the wheel-side shaft section 17 so as to be non-rotatable, but axially displaceable. The axle-side shift claws 33 are formed on a carrier ring 41 which is mounted on the electric machine-side shaft section 19 of spline teeth 43 so as to be non-rotatable, but axially displaceable. On its side axially opposite the wheel-side shaft section 17, the carrier ring 41 is supported by an overload spring 45 against an axial stop 47 of the electric machine-side shaft section 19.

In FIG. 3, the sliding sleeve 37, which is arranged axially displaceable on the wheel-side shaft section 17, is actuable via an actuator 49 which is realized as an electric motor. The actuator 49 may be connected in terms of drive via a self-locking transmission stage 51 to an actuator sleeve 53. The latter is arranged on a cylindrical sliding sleeve outer circumference 55. For the rotational uncoupling of the sliding sleeve 37, which rotates during operation, the actuator sleeve 53 is mounted on the cylindrical sliding sleeve outer circumference 55 via two rolling bearings (optionally also plain bearings) 57, 59. In FIG. 3, a bearing outer ring 61 of the rolling bearings 57, 59 is pressed into the inner circumference of the actuator sleeve 53, that is to say is connected to the actuator sleeve 53 in a manner transmitting actuating force. In addition, a bearing inner ring 63 of the rolling bearing 57, 59 is pressed onto the sliding sleeve outer circumference 55, that is to say is connected to the sliding sleeve 37 in a manner transmitting actuating force. In this way, an axial actuating force FS generated by the actuator 49 is introduced via the rotationally decoupled actuator sleeve 53 and also via the two rolling bearings 57, 59 into the sliding sleeve 37.

The transmission stage 51 connected between the actuator 49 and the actuator sleeve 53 is formed in FIG. 3 by a drive gear wheel 67 which is formed on an actuator shaft and is in toothed engagement with external teeth 69 on the outer circumferential side of the sliding sleeve 37. The external teeth 69 are spaced apart from one another in the axial direction.

A coupling operation (that is to say closing operation) of the claw clutch 21, in which the wheel-side and axle-side shift claws 33, 35 lie axially opposite one another tooth 58 on space 60 (as illustrated in FIG. 3), will be described below with reference to FIG. 3. In this case, the actuator 49 is activated to displace the actuator sleeve 53 together with the sliding sleeve 37, which is coupled in terms of movement thereto, from the open position shown in FIG. 3 into a closed position in which the wheel- and axle-side shift claws 33, 35 are smoothly brought into engagement.

Optionally, in a departure from FIG. 3, in the closing operation the wheel- and axle-side shift claws 33, 35 may not lie axially opposite one another tooth 58 on space 60 but rather, on the contrary, may lie opposite one another tooth 58 on tooth 58. In this case, during the closing operation, the wheel- and axle-side shift claws 33, 35 first of all come into contact tooth 58 on tooth 58. After reaching the tooth 58 on tooth 58 contact, the actuator sleeve 53 together with the sliding sleeve 37 is displaced further by an overload stroke Δh (shown in FIG. 3) until they reach the closed position, with the carrier ring 41, by building up a spring force of the overload spring 45, being displaced on the electric machine-side shaft section 19 by the overload stroke Δh (to the right in FIG. 3). As soon as, e.g., after a small relative angular rotation, tooth 58 is opposite space 60, the carrier ring 41, by using up the overload stroke Δh and by dissipating the spring force of the overload spring 45, is brought abruptly into positively locking connection with the axle-side shift claws 33 of the sliding sleeve 37.

For the coupling (that is to say during closing of the claw clutch 21), first of all the electric machine EM is energized and therefore the displaceable part (that is to say the wheel-side shift claws 35) of the claw clutch 21 is synchronized with the current wheel rotational speed $n_{rad}$. If synchronicity is virtually achieved, the actuator 49 is activated to close the claw clutch 21.

Figure 4:
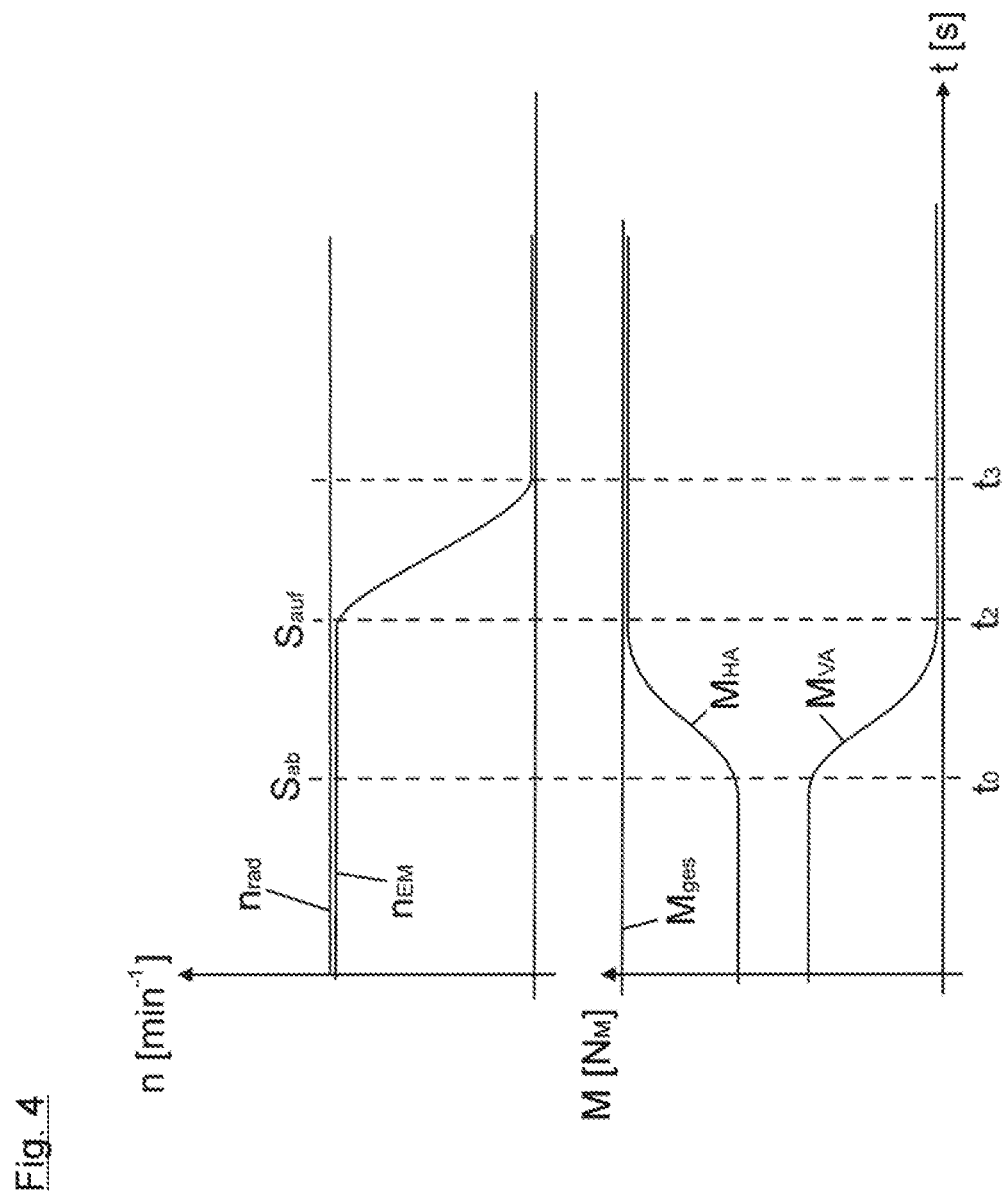
FIGS. 4 and 5 are graphs of a decoupling operation and a coupling operation, respectively.
Figure 5:
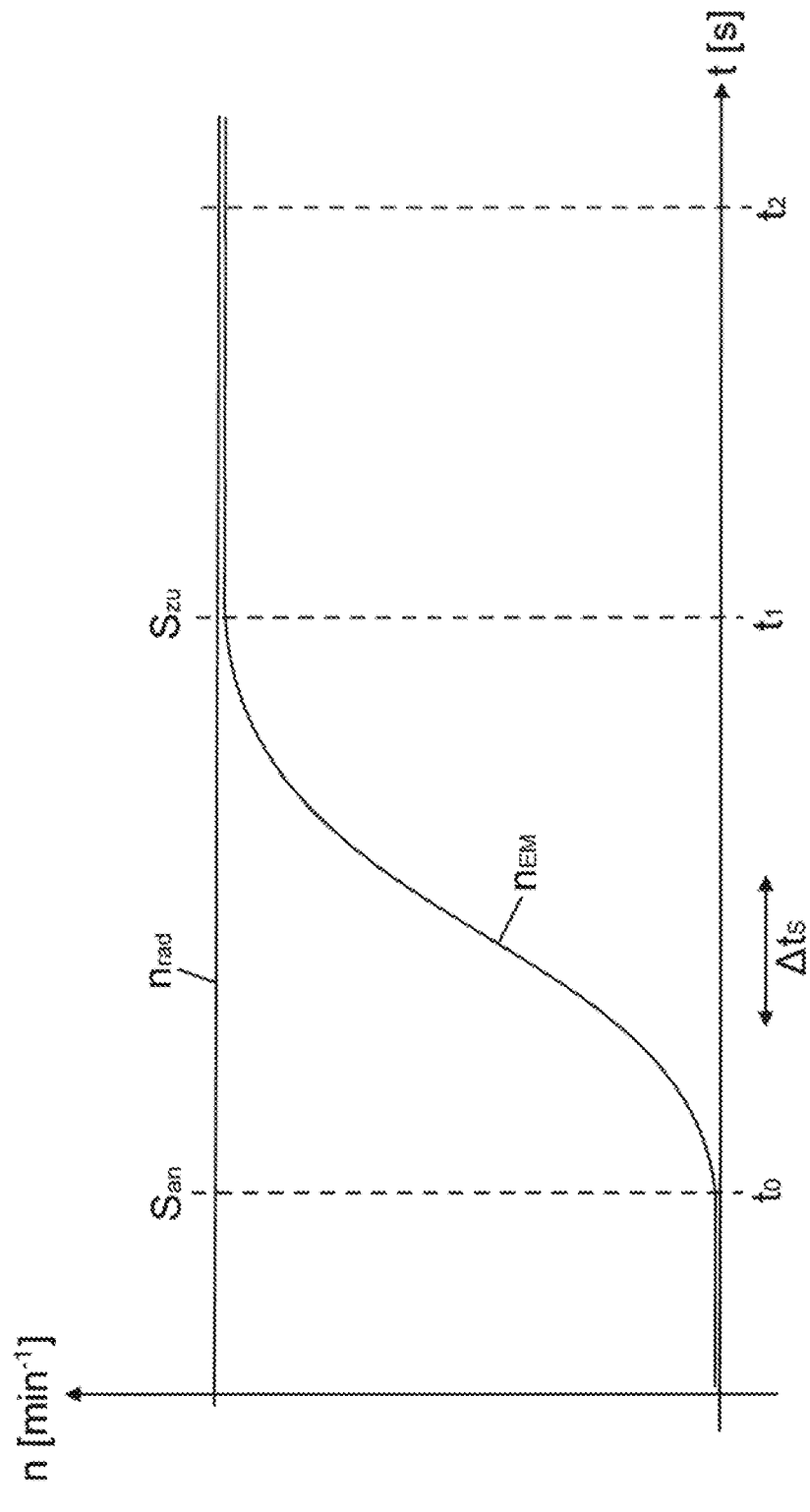

In the following, a decoupling operation is described with reference to FIG. 4 and a coupling operation with reference to FIG. 5. In respect of easier understanding of the diagrams in FIGS. 4 and 5, the illustrated progressions of the wheel rotational speed $m_{ad}$ and of the electric machine rotational speed $n_{EM}$ are depicted with transmission ratios eliminated:

In the diagram of FIG. 4, the starting point is a driving situation in which, up to a time t0, all of the electric machines EM, EM1, EM2 are activated and both the front axle VA and the rear axle HA are connected in the drive train. In FIG. 4, the front axle VA is driven with a front axle torque $M_{VA}$ via the electric machine EM, while the rear axle HA is driven by a rear axle torque $M_{HA}$ (via the electric machines EM1, EM2). The sum of the front axle and rear axle torque $M_{VA}$ and $M_{HA}$ corresponds to an overall torque $M_{ges}$ requested by the driver via the gas pedal. The $M_{ges}$ is divided by a main control device 70 into the front axle torque $M_{VA}$ and into the rear axle torque $M_{HA}$ depending on current driving mode parameters.

In FIG. 4, a decoupling signal $S_{ab}$ (time $t_0$) is generated in a main control device 70, for example a driving dynamics controller, depending on current driving mode parameters. When the decoupling signal $S_{ab}$ is generated, a torque displacement starts, in which the front axle torque $M_{VA}$ is reduced and at the same time the rear axle torque $M_{HA}$ is increased by the same amount, specifically with the overall torque $M_{ges}$ being unchanged as a whole, to avoid comfort losses for the driver. In addition, the coordinator 71 starts a zero-torque regulation. During the zero-torque regulation, the front axle electric machine EM is brought slightly into a propulsion mode. As a result, the drag torque acting in the claw clutch 21, which is still closed, is compensated for or eliminated. In this way, the claw clutch 21 which is still closed is free from torque or free from load. As soon as torque freedom is achieved, the coordinator 71 produces a clutch opening signal $S_{auf}$ (at the time $t_2$ in FIG. 4) such that the claw clutch 21 can be opened free from load. At the time $t_3$, the rotational speed $n_{EM}$ of the deactivated electric machine EM is reduced to zero while the wheel rotational speed $n_{rad}$ remains constant beyond the decoupling operation.

A coupling operation will be described below with reference to FIG. 5: the diagram shown in FIG. 5 starts from a driving situation in which, up to the time $t_0$, only the rear axle HA with activated rear axle electric machines EM1, EM2 is connected into the drive train, while the front axle VA with deactivated electric machine EM (that is to say $n_{EM}=0$) is decoupled from the drive train. The wheel-side shaft section 17 therefore rotates at a wheel rotational speed $n_{rad}$, while the electric machine rotational speed $n_{EM}$ is 0 up to the time $t_0$. At the time $t_0$, the main control device 70 generates a coupling signal $S_{an}$ on the basis of current driving mode parameters to connect the front axle VA into the drive train. A synchronization $\Delta t_s$ subsequently takes place, in which the still decoupled electric machine EM is regulated to a synchronization rotational speed to approximately produce synchronism between the two shaft sections 17, 19. As soon as there is synchronism, the coordinator 71 produces a closing signal $S_{zu}$ (time $t_1$) such that the claw clutch 21 is closed in a load-free manner and the electric machine EM can pass a driving torque to the drive train. At the time $t_2$, the actuator sleeve 53 reaches its closed position corresponding thereto.

As is furthermore revealed in FIG. 3, a position sensor 77 is assigned to the actuator control device 71. A sliding sleeve actual position can be detected with the aid of the position sensor 77. Within the scope of a plausibility check, the sliding sleeve actual position can be compared in the coordinator 71 with a sliding sleeve decoupling position or a sliding sleeve coupling position (both stored in the coordinator 71).

After the coupling operation has taken place, a plausibility check is carried out in the coordinator 71, in which the sliding sleeve actual position detected by the position sensor 77 is compared with the sliding sleeve coupling position stored in the coordinator 71. If the sliding sleeve actual position coincides with the sliding sleeve coupling position stored in the coordinator 71, a coupling operation has been successful.

In the same manner, after a decoupling operation has taken place, a plausibility check is carried out in the coordinator 71, in which the sliding sleeve actual position detected by the position sensor 77 is compared with the sliding sleeve decoupling position stored in the coordinator 71. If the sliding sleeve actual position coincides with the sliding sleeve decoupling position stored in the coordinator 71, a decoupling operation has been successful.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

LIST OF REFERENCE SIGNS

3 Front axle differential
5 Front wheels
7, 9 Drive shafts of the front axle
11 Drive shafts of the rear axle
15 Rear wheels
17 Wheel-side shaft section
19 Electric machine-side shaft section
21 Claw clutch
23 Reduction gearing
25 Outer gearwheel
27 Axle bevel gears
29 Compensating bevel gears
31 Compensating housing
33 Axle-side shift claws
35 Wheel-side shift claws
37 Sliding sleeve
39 Spline teeth
41 Carrier ring
43 Spline teeth
45 Overload spring
47 Axial stop
49 Actuator
51 Transmission stage
53 Actuator sleeve
54 Inner corner region
55 Cylindrical sliding sleeve outer circumference
57, 59 Rolling bearings
61 Bearing outer ring
63 Bearing inner ring
67 Drive gear wheel
69 External teeth
71 Coordinator
73, 75 Rotational speed sensors
77 Position sensor
EM,EM1,EM2 Electric machines
U1,U2 Transmission ratio stages
666 h Overload stroke
I Open position
II Closed position
$M_{VA}$ Front axle driving torque
$M_{HA}$ Rear axle driving torque
$M_{ges}$ Overall driving torque
$\Delta t_s$ Synchronization
$n_{rad}$ Wheel rotational speed
$n_{EM}$ Electric machine rotational speed
$S_{an}$ Coupling signal of the main control device 70
$S_{ab}$ Decoupling signal of the main control device 70
$S_{auf}$ Opening signal of the coordinator 71
$S_{zu}$ Closing signal of the coordinator 71

The invention claimed is:

1. A drive apparatus for a two-track vehicle, having an electric machine operating as a motor to drive vehicle wheels via an axle differential, comprising:
   output shafts respectively coupled to the vehicle wheels, one of the output shafts being divided into first and second shaft sections, the first shaft section having spline teeth; and
   a positively locking clutch, configured to couple the first and second shaft sections in a driving mode of the electric machine to drive the vehicle wheels, and to decouple the first and second shaft sections when the electric machine is deactivated, thereby reducing drag losses, the positively locking clutch including
      a sliding sleeve arranged on the spline teeth of the first shaft section nonrotatably, but displaceable axially, in response to an actuating force, between an open coupling state of the sliding sleeve not in positively locking connection with the second shaft section, and a closed clutch state of the sliding sleeve in the positively locking connection with the second shaft section,
      an actuator configured to generate the actuating force in response to a closing signal, and
      a coordinator, communicatively connected to the actuator and in electric signal connection with the electric machine, configured to send the closing signal to the actuator when a clutch engagement requirement exists, thereby activating the actuator to close the positively locking clutch, and, when the clutch engagement requirement does not exist, to send an opening signal to the actuator to open the positively locking clutch, and to activate the electric machine before either of a coupling operation and a decoupling operation, whereby during each of the coupling operation and the decoupling operation a substantially load-free actuation of the positively locking clutch is possible.

2. The drive apparatus as claimed in claim 1, wherein, before the coupling operation, the coordinator
   activates the electric machine and obtains synchronization substantially between the first and second shaft sections, and starts, when the synchronism substantially exists, the coupling operation by sending to the actuator the closing signal.

3. The drive apparatus as claimed in claim 2, wherein, before the decoupling operation, the coordinator
activates the electric machine and obtains torque freedom while the positively locking clutch is closed, and
starts, when the torque freedom exists, the decoupling operation by sending to the actuator the opening signal.

4. The drive apparatus as claimed in claim 3, wherein, during both the synchronization and the torque freedom, the coordinator monitors one of a wheel rotational speed and a rotational speed correlating therewith.

5. The drive apparatus as claimed in claim 4,
further comprising a position sensor configured to detect a position of the sliding sleeve, and
wherein the coordinator is electrically connected to the position sensor, and after at least one of the coupling operation and the decoupling operation has taken place, a plausibility check of an actual position of the sliding sleeve detected by the position sensor is performed.

6. The drive apparatus as claimed in claim 5,
wherein the sliding sleeve has a cylindrical sliding sleeve outer circumference,
wherein the drive apparatus further comprises:
at least one rotary bearing having a bearing inner ring and a bearing outer ring, and
an actuator sleeve mounted on the sliding sleeve outer circumference via the at least one rotary bearing, and
wherein the actuating force generated by the actuator is introduced, when the actuator sleeve is rotationally uncoupled, by an actuating force transmission via the bearing outer ring of the rotary bearing connected to the actuator sleeve and the bearing inner ring of the rotary bearing connected to the sliding sleeve both transmitting actuating force.

7. The drive apparatus as claimed in claim 6,
wherein the actuator sleeve is displaceable by the actuator between an open position of the positively locking clutch, and a closed position,
wherein the actuator has an electric motor with an actuator shaft driving a gear wheel, and
wherein external teeth are formed on the cylindrical sliding sleeve outer circumference, spaced apart in the axial direction, in toothed engagement with the gear wheel of the actuator shaft of the electric motor of the actuator.

8. The drive apparatus as claimed in claim 7,
wherein the sliding sleeve and the second shaft section have mutually axially facing claws larger in diameter than the cylindrical sliding sleeve outer circumference, and
wherein the sliding sleeve has an inner corner region and the actuator sleeve is arranged in the inner corner region of the sliding sleeve.

9. The drive apparatus as claimed in claim 2, wherein, during the synchronization, the coordinator monitors one of a wheel rotational speed and a rotational speed correlating therewith.

10. The drive apparatus as claimed in claim 1, wherein, before the decoupling operation, the coordinator
activates the electric machine and obtains torque freedom while the positively locking clutch is closed, and
starts, when the torque freedom exists, the decoupling operation by sending to the actuator the opening signal.

11. The drive apparatus as claimed in claim 10, wherein, during the torque freedom, the coordinator monitors one of a wheel rotational speed and a rotational speed correlating therewith.

12. The drive apparatus as claimed in claim 1,
further comprising a position sensor configured to detect a position of the sliding sleeve, and
wherein the coordinator is electrically connected to the position sensor, and after at least one of the coupling operation and the decoupling operation has taken place, a plausibility check of an actual position of the sliding sleeve detected by the position sensor is performed.

13. The drive apparatus as claimed in claim 1,
wherein the sliding sleeve has a cylindrical sliding sleeve outer circumference,
wherein the drive apparatus further comprises:
at least one rotary bearing having a bearing inner ring and a bearing outer ring, and
an actuator sleeve mounted on the sliding sleeve outer circumference via the at least one rotary bearing, and
wherein the actuating force generated by the actuator is introduced, when the actuator sleeve is rotationally uncoupled from the sliding sleeve, by an actuating force transmission via the bearing outer ring of the rotary bearing connected to the actuator sleeve and the bearing inner ring of the rotary bearing connected to the sliding sleeve both transmitting actuating force.

14. The drive apparatus as claimed in claim 13,
wherein the actuator sleeve is displaceable by the actuator between an open position of the positively locking clutch, and a closed position,
wherein the actuator has an electric motor with an actuator shaft driving a gear wheel, and
wherein external teeth are formed on the sliding sleeve outer circumference, spaced apart in the axial direction, in toothed engagement with the gear wheel of the actuator shaft of the electric motor of the actuator.

15. The drive apparatus as claimed in claim 1,
wherein the sliding sleeve has a cylindrical sliding sleeve outer circumference,
wherein the sliding sleeve and the second shaft section have mutually axially facing claws larger in diameter than the cylindrical sliding sleeve outer circumference, and
wherein the sliding sleeve has an inner corner region and the actuator sleeve is arranged in the inner corner region of the sliding sleeve.

16. A method for operating a drive apparatus for a vehicle axle of a two-track vehicle, comprising:
driving vehicle wheels by an electric machine, operating as a motor, via an axle differential and output shafts, one of the output shafts being divided into first and second shaft sections;
coupling and decoupling the first and second shaft sections by a positively locking clutch in a driving mode to bring the electric machine into driving connection with one of the vehicle wheels by the coupling and to reduce drag losses by the decoupling when the electric machine is deactivated, the positively locking clutch having a sliding sleeve arranged on spline teeth of the first shaft section nonrotatably, but displaceable axially by an actuating force between an open coupling state, in which the sliding sleeve is not in positively locking connection with the second shaft section, and a closed clutch state, in which the sliding sleeve is brought into positively locking connection with the second shaft section;

generating the actuating force by an actuator in electric signal connection with a coordinator;

activating the actuator by the coordinator when a clutch engagement requirement exists by sending a closing signal to close the positively locking clutch;

activating the actuator by the coordinator when the clutch engagement requirement does not exist by sending an opening signal to open the positively locking clutch;

activating the electrical machine before either of the coupling and decoupling by the coordinator activating the electric machine, whereby during each of the coupling and the decoupling a substantially load-free actuation of the clutch is possible.

* * * * *